United States Patent [19]
Janus

[11] 3,873,341
[45] Mar. 25, 1975

[54] RAPID CONVERSION OF AN IRON OXIDE FILM

[75] Inventor: Alan R. Janus, Pasadena, Calif.

[73] Assignee: Material Sciences Corporation

[22] Filed: Dec. 26, 1972

[21] Appl. No.: 318,074

[52] U.S. Cl..................... 117/37 R, 117/62, 117/63, 117/93, 117/93.3, 117/102 R, 117/102 M, 117/106 R, 117/107, 117/212, 156/6, 156/7, 156/13, 204/192
[51] Int. Cl............................................. C23c 15/00
[58] Field of Search............ 117/45, 212, 106 R, 62, 117/63, 93, 93.3, 37 R, 102 R, 102 M, 107; 156/6, 7, 13; 204/192

[56] References Cited

UNITED STATES PATENTS

| | | | |
|---|---|---|---|
| 3,615,953 | 10/1971 | Hill | 156/17 |
| 3,695,908 | 10/1972 | Szupillo | 117/8 |

OTHER PUBLICATIONS

Sinclair, et al., "Materials for Use in a Durable Selectively Semitransparent Photomask," J. Electrochem. Soc., Feb. 1971, pp. 341–344.

MacChesney, et al., "Chemical Vapor Deposition of Iron Oxide Films for Use as Semitransparent Masks," J. Electrochem. Soc., May 1971, pp. 776–780.

*Primary Examiner*—Thomas J. Herbert, Jr.
*Assistant Examiner*—Bruce H. Hess
*Attorney, Agent, or Firm*—Nilsson, Robbins, Bissell, Dalgarn & Berliner

[57] ABSTRACT

Amorphous iron oxide is deposited on the surface of a substrate at a temperature within 7% of its crystallization temperature to provide a layer thereof which can be crystallized in 10 milliseconds or less. In a particular embodiment, the amorphous ferric oxide is deposited on a semiconductor surface to provide a mask therefor for subsequent diffusion processing, or the like.

14 Claims, 8 Drawing Figures

RAPID CONVERSION OF AN IRON OXIDE FILM

FIELD OF THE INVENTION

The field of art to which the invention pertains includes the field of metal oxide coating and semiconductor masking processes.

BACKGROUND AND SUMMARY OF THE INVENTION

It is a common technique in the manufacture of electrical devices from semiconductor material to modify the electrical properties of selected portions of the material by processes wherein dopants are deposited in the material through the surface of the semiconductor body. A masking pattern or protective material, such as silicon dioxide, is formed on the semiconductor surface and the dopant is introduced by diffusion, ion implantation, solution growth or other well known technique, or a layer of contrasting material is applied, e.g., by evaporation, sputtering, solution growth technique, or the like. Such processes are costly, involving a large number of steps including: (a) formation of a uniform silicon dioxide surface, (b) spinning on a photosensitive resist material, (c) exposure of the resist to actinic radiation in the desired pattern, (d) development of the resist to expose selected pattern portions on the silicon dioxide, (e) etching of the exposed silicon dioxide portions, (f) stripping of the remaining resist material and (g) dopant deposition through the silicon dioxide pattern.

The present invention provides a process to shorten the foregoing procedure and includes the steps of: (a) formation of a uniform layer of amorphous iron oxide, under certain temperature conditions, on the surface of the semiconductor body, (b) exposure of the iron oxide layer to a pattern of thermal energy to crystallize the iron oxide in the exposed regions, (c) removing the remaining iron oxide, e.g., by acid washing and (d) dopant deposition through the pattern formed by the crystalline iron oxide.

In a copending application of common assignment, Ser. No. 280,606, filed Aug. 14, 1972, entitled "PROCESS FOR FORMING A METAL OXIDE PATTERN" by Janus, Fletcher, Ridosh and Freihube, there are disclosed processes for the formation of a layer of amorphous metal oxide on a substrate and means for selective crystallization to obtain a pattern of crystallized metal oxide. The present process is an improvement on the Janus, et al., procedure permitting shortened exposure times for crystallization of amorphous iron oxide and therefore facilitates commercial use of the process to form masks for semiconductor processing. Specifically, a uniform layer of amorphous iron oxide is deposited on a semiconductor surface at a temperature within 7%, preferably within 2%, of its crystallization temperature in degrees Kelvin. The resultant amorphous layer can then be crystallized using a source of thermal energy which imparts 100 Joules/cm$^2$, or more to its surface. As a source of the thermal energy, one can use an electron beam, laser beam, xenon flash or other suitably energized source. With such sources effective exposures of 10 milliseconds or less can crystallize the oxide. Thereafter, the uncrystallized portions can be removed by simple acid washing to yield a masked surface for further processing.

In its broader aspects, the processes of the present invention can be used on any substrate which maintains its integrity at the processing temperature. Thus, by using a glass substrate, one can prepare photomasks having exceptional resolution and which are useful in manufacturing printed circuits and the like. Since thin layers of iron oxide are semitransparent one can make photomasks. By using a plastic substrate, one can prepare microfilm and microfiche copies having good resolution.

As prior art there may be considered U.S. Pat. Nos. 2,332,309, 2,698,812, 3,108,014, 3,148,079, 3,192,262, 3,256,109, 2,847,330, 3,364,087, 2,923,624, 3,442,701, 3,388,053 and 3,395,091. Other publications of interest are: "Materials for Use in a Durable Selectively Semitransparent Photomask" by W. R. Sinclair, M. V. Sullivan and R. A. Fastnacht, *Journal of the Electrochemical Society*, Vol. 118, pages 341–344; "Chemical Vapor Deposition of Iron Oxide Films for use as Semitransparent Masks" by J. B. MacChesney, P. B. O'Connor and M. V. Sullivan, *Journal of the Electrochemical Society*, vol. 118, pages 776–781; "Vacuum Deposition of Thin Films" by L. Holland, Chapman, and Hill, Ltd. (London), 1936, pages 474–480; "Reversible High-Speed High-Resolution Imaging in Amorphous Semiconductors" by S. R. Ovshinsky and T. H. Klose, International Symposium on Information Display, 1971, pages 55–61; and "Electron Beams Shine on IC Layouts" by L. Curran, *Electronics*, June 21, 1971, pages 83–84.

DETAILED DESCRIPTION

For convenience of explanation, the following material will refer primarily to formation of a layer of undoped iron oxide and crystallization thereof on a substrate of semiconductor material. However, the process can be used with iron oxide which has been doped to modify its crystallization temperature. For example, one can use a mixture of iron oxide and 10–20% vanadium oxide. Suitable substrates include semiconductor materials, glass, metals, plastics which maintain their integrity at the temperature of crystallization (such as Mylar — a transparent polyethylene teraphthalate, Kapton — a polyamide, polyethylene, etc.) or the like.

In using the term "semiconductor" to describe materials suitable as substrates, reference is made not to the actual electrical properties of the material but rather to the nature of the material in its native state, i.e., before doping thereof. The term "semiconductor material" is meant to include silicon, germanium-silicon alloys, compounds such as silicon carbide, indium antimonide, gallium antimonide, aluminum antimonide, indium arsenide, zinc sulfide, gallium arsenide, gallium phosphorus alloys, indium phosphorus alloys, lead selenide, lead telluride, and the like. Active impurities are those impurities (dopants) which affect the electrical rectification characteristics of semiconductor materials as distinguished from other impurities which have no appreciable affect on these characteristics. For gallium arsenide and the like, sulfur, tellurium and selenium are donor impurities. For silicon or other group IV semiconductors, phosphorus, arsenic and antimony are donor impurities, whereas boron, aluminum and gallium are acceptor impurities.

Figure 1:
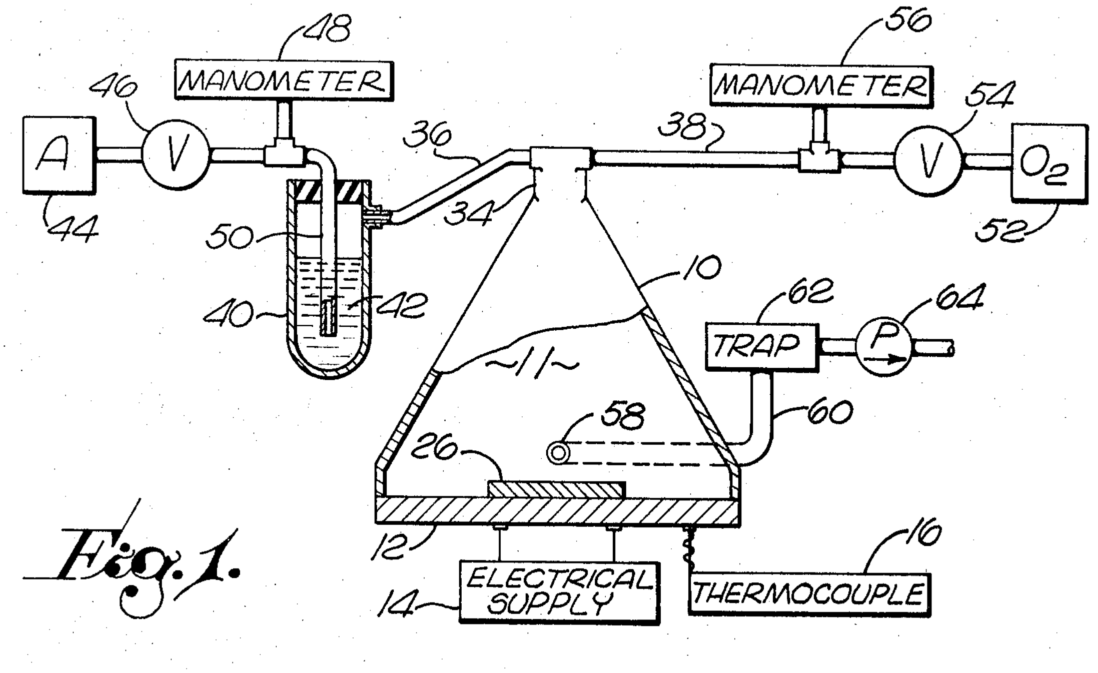
FIG. 1 is a diagrammatic view of apparatus for applying a layer of amorphous iron oxide to the surface of a substrate, using chemical vapor deposition techniques.

Referring to FIG. 1, there is illustrated a method for the chemical deposition on a semiconductor substrate of a layer of amorphous iron oxide. The drawing is schematic and serves to illustrate the process steps; therefore, relative sizes and positions are not to be taken literally but are used for convenience and ease of illustration. In this regard, reference can be made to the aforenoted MacChesney article for process details and to various of the patent references such as Galler U.S. Pat. No. 3,108,104 and Bakish, et al., U.S. Pat. No. 3,190,262 for other types of apparatus for accomplishing deposition. These patents relate to the deposition of a metal film, but can be modified for the introduction of oxygen for the deposition of an iron oxide film in accordance with the MacChesney, et al., article.

The apparatus includes a housing 10 enclosing a deposition chamber 11 and includes a bottom wall 12 having implanted heating elements (not shown) connected to an electrical supply 14 and thermocouple 16 therefor. The apparatus housing 10 is formed at its upper end with a neck 34 which continues as a T junction forming two gas conduits 36 and 38. A side-arm tube 40 is connected to one of the conduits 36 and contains a supply 42 of liquid iron pentacarbonyl. A source 44 of inert gas, such as argon, is metered by a valve 46 past a manometer 48, via a tube 50 into the iron pentacarbonyl supply 42 to carry iron pentacarbonyl vapors through the conduit 36 into the T junction. A supply 52 of oxygen is metered by a valve 54 past a monometer 56 into the T junction to combine with the iron pentacarbonyl in the deposition chamber 11.

A substrate body 26 of semiconductor material, such as silicon, is disposed in the deposition chamber supported by the heated bottom wall 12. The bottom wall is heated to a temperature as defined hereinafter to lie within a range related to the crystallization temperature of the deposited amorphous metal oxide.

As the iron pentacarbonyl vapors contact the heated substrate 26, the iron pentacarbonyl is thermally decomposed and, as a result of interaction with the oxygen, a layer of amorphous iron oxide is formed on the substrate 26. The process is conducted for a time sufficient to deposit a uniform coating on the substrate 26 as desired, generally about 250 A – 3,000 A, preferably about 500 A – 1,500 A, as will be referred to hereinafter in more detail.

The chamber housing 10 is formed with an opening 58 at the bottom thereof connected via a conduit 60 to a trap 62 and from there to a pump 64 which exhausts the chamber at a rate adjusted to correspond with the metering action of the valves 46 and 54.

Importantly, the substrate is heated at a temperature which is less than the crystallization temperature of the amorphous iron oxide (in the case of undoped oxide, less than 160°C) to deposit the oxide as an amorphous layer. In accordance with this invention, the deposition temperature is below but within 7%, preferably within 2%, of the crystallization temperature in degrees K of the amorphous iron oxide.

Figure 2:
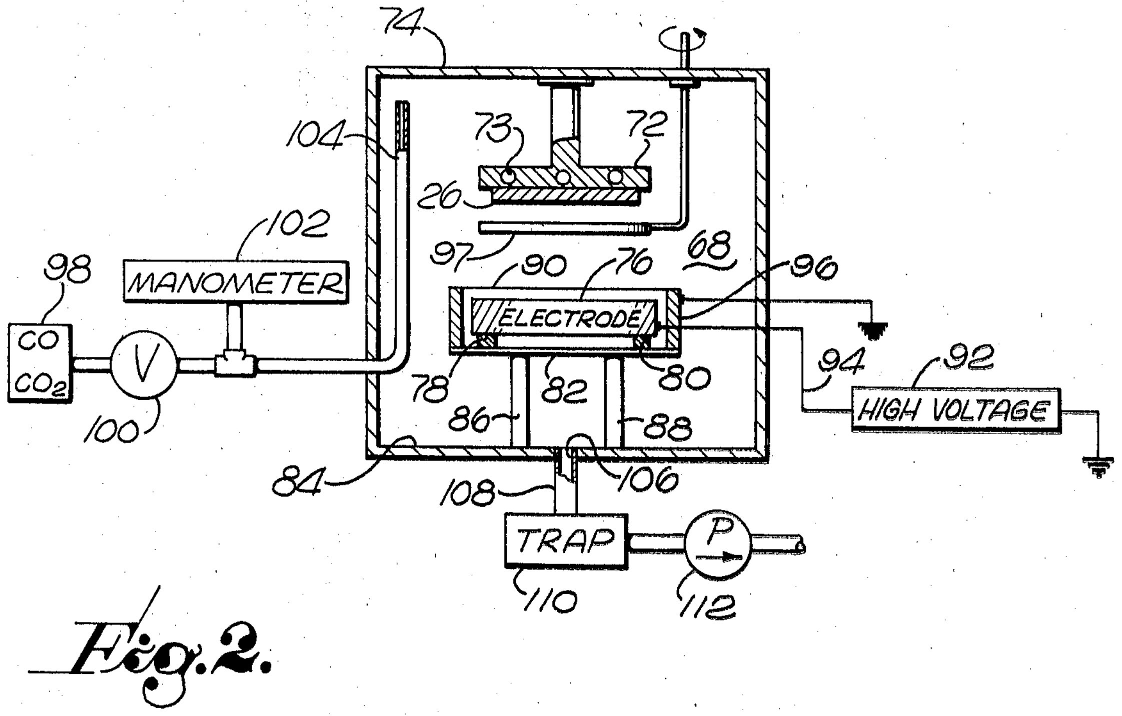
FIG. 2 is a diagrammatic view of apparatus for applying a layer of amorphous iron oxide to a substrate, using sputtering techniques.

Referring to FIG. 2, there is illustrated another method for preparing a layer of amorphous iron oxide, using a sputtering technique; in this regard, reference can be made to the aforenoted Sinclair, et al., article. The apparatus includes a housing 66 enclosing a sputtering chamber 68 in which the substrate body 26 of semiconductor material is secured to a support 72 dependent from the top wall 74 of the housing. A heating element 73 is disposed in the support 72 and maintained at a suitable temperature, in the range given above with respect to the vapor deposition apparatus. A sputtering electrode 76, an iron disk, supported in spaced opposed relationship to the plate 70 by insulative spacers, such as at 78 and 80, on a platform 82, which in turn is supported spaced from the housing wall 84 by legs, such as 86 and 88. A grounded annular conductive shield 90 is disposed spaced laterally around the electroplate 76. A source 92 of high voltage is connected by a lead 94 to the electroplate 76 through an aperture 96 in the shield 90. A rotatable cover mask is disposed in the sputtering path to control the sputtering.

A source 98 of reactive gas mixture is fed via a metering valve 100, past a monometer 102, into the chamber 68 by means of a conduit tube 104. Exhaust gases are drawn through an opening 106 in the floor of the housing 66 via a conduit 108 through a trap 110 by means of a pump 112 adjusted with the metering valve 100 to maintain a low pressure atmosphere in the chamber 68, about 60mTorr as described in copending application Ser. No. 280,606, referred to above. By using a mixture of carbon monoxide and carbon dioxide (optionally mixed with argon), the iron is sputtered onto the substrate 26 as amorphous iron oxide. The electrode disk 76 can be sputtered at 2,500 volts and 100 milliamperes, sputtering time being controlled so as to deposit an oxide layer having a thickness of about 250–3,000 A, preferably about 500 – 1,500 A. The heating element 73 is maintained at a temperature below 160°C and, as with the vapor deposition technique described above, at a temperature within the range of 7% of the crystallization temperature, i.e., at least 130°C and less than 160°C for undoped iron oxide. A preferable range as noted above, is within 2% of the crystallization temperature, i.e., at least 152°C but below 160°C.

The foregoing procedures provide a semiconductor body 26 formed with a layer of amorphous iron oxide. By heating the amorphous layer to a temperature at or above its crystallization point, it can be converted to crystalline iron oxide. By limiting such heating to selected portions of the layer, one can form a pattern of crystalline iron oxide against a background of amorphous iron oxide. Importantly, the amorphous iron oxide is much more readily removable, e.g., by acid wash, than is the crystalline iron oxide, allowing the portions which are not selectively heated to be removed, leaving the crystalline iron oxide on the substrate surface as a pattern mask. As will be referred to hereinafter in more detail, by limiting the thickness of the amorphous iron oxide layer to a maximum of 3,000 A, preferably 1,500 A, and by selectively heating with a source of thermal energy which imparts to the heated regions at least 100 Joules/cm$^2$, one can crystallize the iron oxide in 10 milliseconds or less.

Figure 3:
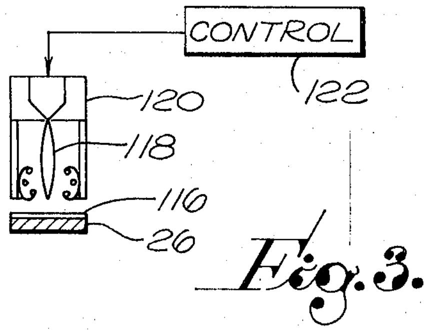
FIG. 3 is a schematic representation of a mechanism utilizing an electron beam to provide a thermal pattern on a layer of amorphous iron oxide.

Referring to FIG. 3, one method is known for providing a thermal pattern on the surface of the amorphous iron oxide layer with sufficient heat content to provide crystallization in the desired time. In this embodiment, an electron beam 118 is utilized to effect desired local temperature changes. The electron beam 118 is generated by any mechanism 120 as known to the prior art and as determined by a control 122. The beam 118 impinges onto the amorphous iron oxide surface 116 of the substrate 26 to impart a pattern of crystalline oxide in accordance with the programmed control 122.

Figure 4:
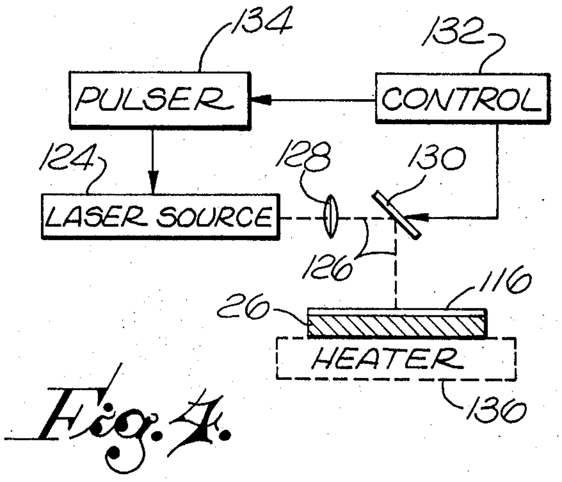
FIG. 4 is a schematic representation of a mechanism utilizing a laser beam to provide a thermal pattern on a layer of amorphous iron oxide.

Referring to FIG. 4, an alternative thermal imaging station is shown. In this embodiment a laser source 124 provides a laser beam 126 along an optical axis. The laser source 124 may be a gas laser or a solid state laser, such as a ruby rod that is energized by a flash tube, as is well known in the art. The laser beam 126 is directed through an optical lens 128 and reflected from a mirror surface 130 onto the layer 116 of amorphous iron oxide carried by the semiconductor substrate 126. The optical lens 128 focuses the laser beam 126 to a desired resolution and energy concentration so that the regions of the iron oxide layer exposed to the laser beam are raised above the crystallization temperature. A mechanism (not shown) is provided for pivoting the mirror surface 130 in accordance with a control 132 which also serves to actuate a pulser 136 for energizing the flash tube above the laser device 124 on or off in accordance with the pattern desired to be recorded. The control 132 may include an automated program or a prerecorded magnetic tape having pulses thereon in predetermined relationship, the pulses serving to actuate the pulser 134. If desired, a heater, as shown by the dashed lines 136, can be placed below the substrate 26 to thermally bias the layer of amorphous iron oxide to a predetermined temperature below the crystallization temperature. In such case, the laser beam 126 need only have sufficient energy content to raise the temperature of the iron oxide layer to above the crystallization threshold temperature.

Figure 5:
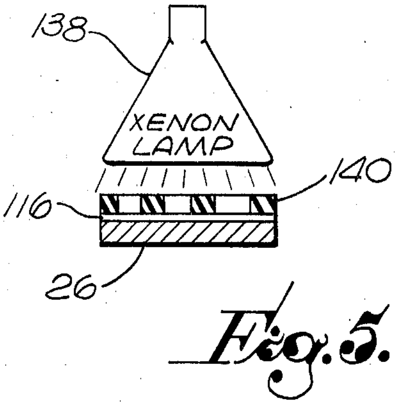
FIG. 5 is a schematic representation of a mechanism utilizing a xenon lamp flash to provide a thermal pattern on a layer of amorphous iron oxide.

Referring to FIG. 5, still another thermal imaging station is illustrated utilizing a xenon lamp 138 which exposes the layer 116 of amorphous iron oxide on the substrate 26 through a thermal absorption or reflection mask 140 (e.g., of chromium metal or ferric oxide). Radiation from the xenon lamp 138 heats the regions immediately below the openings in the mask to a temperature sufficient to rapidly crystallize the amorphous iron oxide. The mask 140 can be in direct contact with the metal oxide layer 116 to achieve high resolution.

Figure 6:
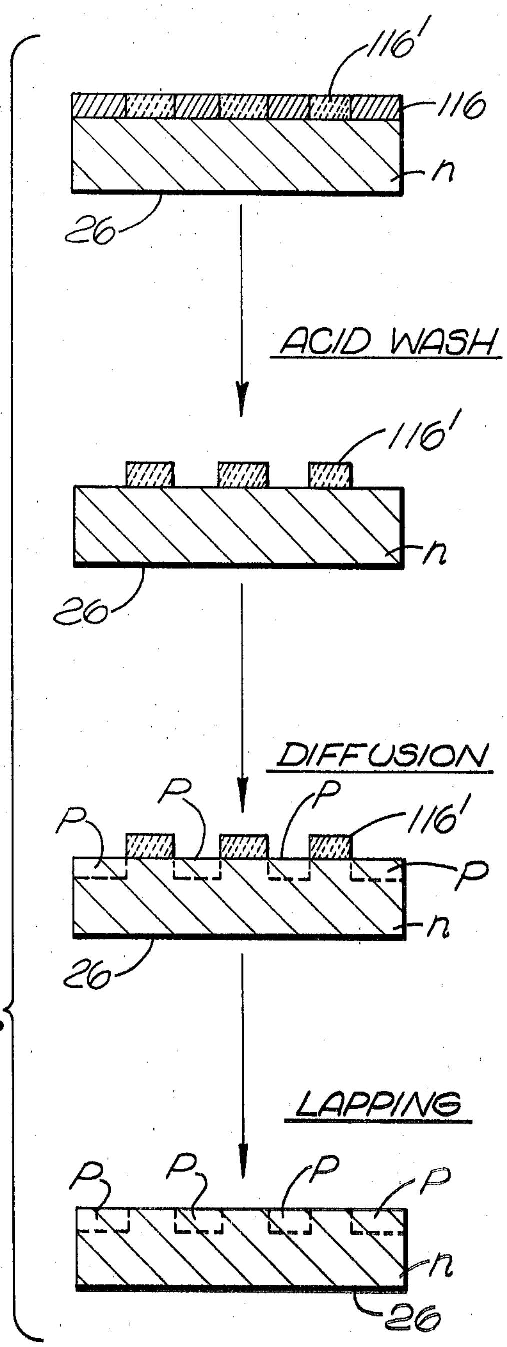
FIG. 6 is a representative step-wise illustration of a development and diffusion process to modify the electrical characteristics of semiconductor material near the surface thereof.

Each of the thermal imaging techniques illustrated in FIGS. 3, 4 and 5 results in the formation of a selected pattern of crystalline iron oxide against a background of amorphous iron oxide. Referring to FIG. 6, there is illustrated process steps for the further treatment of the semiconductor substrate 26 and iron oxide layer 116 whereby the remaining amorphous iron oxide portions are removed by an acid wash to yield a pattern of crystalline iron oxide 116' raised from the surface of the semiconductor substrate 26. In this particular example, the semiconductor substrate 26 is an n-semiconductor material, e.g., gallium arsenide doped with $10^{17}$ atoms/cm$^2$ of tellurium. After removal of the amorphous iron oxide, the masked semiconductor body 26 is subjected to a diffusion process as well known to the art whereby the exposed surface portions are subjected to a gaseous chemical containing elements which can influence the electrical characteristics of the semiconductor material. In this example, a gaseous atmosphere containing zinc atoms is applied to the exposed surface of the semiconductor material 26 so that sufficient amount of zinc atoms penetrate to convert the region thereunder to a p-type conductivity. Thereafter, the top surface of the semiconductor substrate can be lapped to remove the crystalline iron oxide mask therefrom and yield a usable semiconductor device having pn junctions therein.

The foregoing diffusion procedure is merely exemplary; the masked semiconductor substrate can be utilized in any manner in which the art utilizes silicon dioxide, silicon nitride, photoresists or other masking techniques, i.e., in diffusion processes, in implantation processes, with epitaxial techniques, solution growth techniques, vapor transport techniques, etc. Any semiconductor material and any dopant materials, as referred to above, can be utilized. Since crystalline iron oxide is much denser than silicon dioxide, a better diffusion mask is provided.

In removing the amorphous iron oxide portions, one can simply immerse the substrate in concentrated hydrochloric acid, or any strong acid which will dissolve the amorphous iron oxide but not dissolve the crystalline iron oxide. Reference can be made to copending application Ser. No. 280,606 referred to hereinbefore, for the use of hydrogen halide vapor as a facile means for removing the amorphous iron oxide.

Practicalities in utilizing an iron oxide as a masking element for semiconductor processing techniques requires that the conversion of the amorphous form of the oxide to the crystalline form be accomplished at a high rate of speed, preferably 10 milliseconds or less. In accordance with one aspect of the invention a higher crystallization rate for the amorphous iron oxide is provided by depositing the iron oxide at a temperature which is below but within 7%, preferably below but within 2%, of the crystallization temperature in °K of the amorphous iron oxide. Although the reasons are not fully understood, it is hypothesized that by using a relatively high deposition temperature in forming the amorphous iron oxide, the molecules undergo a degree of preordering; i.e., at higher temperatures, there is more opportunity for the molecules to obtain an ordered orientation. Accordingly, crystallization rate is directly related to the deposition temperature. The crystallization is also directly related to the thickness of the amorphous iron oxide layer. Therefore, to aid in obtaining high rates or crystallization, the layer of amorphous iron oxide should be thin, generally no thicker than 3,000 A, preferably no thicker than 1,500 A. Thinness of the layer must be balanced against opacity of the layer in its use as a mask in semiconductor transfer techniques and a practical lower level of thickness is about 250 A, preferably 500 A. Further in accordance herewith, it is desirable to utilize a relatively high thermal energy source for forming the pattern of crystalline iron oxide. As illustrated in FIGS. 3, 4 and 5, sources which can be utilized to form thermal patterns with high caloric content include electron beams, laser sources and xenon lamps. Each of these sources can be controlled, either directly or by use of a mask (as with the xenon lamp) to yield any desired image. Generally, the source chosen should be capable of imparting to the amorphous iron oxide layer at least 100 Joules/cm². Even with such high energy sources, the practical utilization of the amorphous iron oxide layer to form a mask in reasonable time requires the foregoing criteria of controlled deposition temperature and thickness of the layer.

Figure 7:
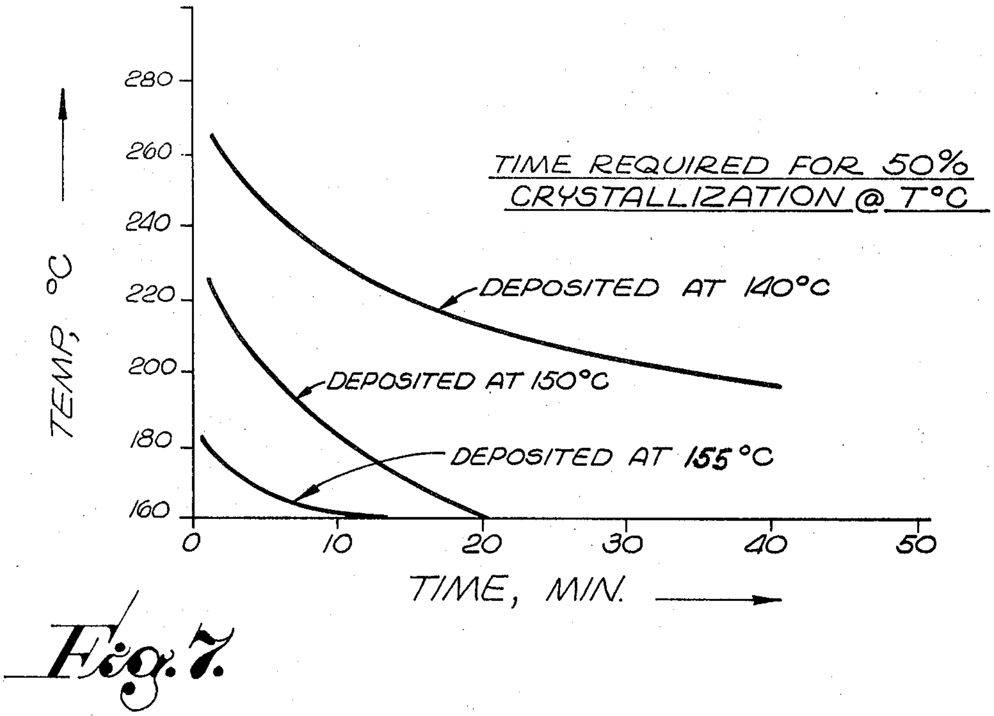
FIG. 7 is a plot of time required for 50% crystallization, at various temperatures, of amorphous iron oxide deposited at various temperatures.

Referring to FIG. 7, the time-temperature relationships for 50% crystallization of a film is shown for iron oxide films deposited at various temperatures of from 140°C to about 160°C. It will be seen that higher temperatures and greater time exposures are required for amorphous iron oxide films deposited at 140°C than at 150°C and similarly greater temperatures and time exposures are needed for films deposited at 150°C than at 160°C. The relationship between the time required for 50% crystallization, *t*, and temperature, *T*, in degrees C, is logarithmic, to wit:

$$1/T = -A \log t + C$$

Figure 8:
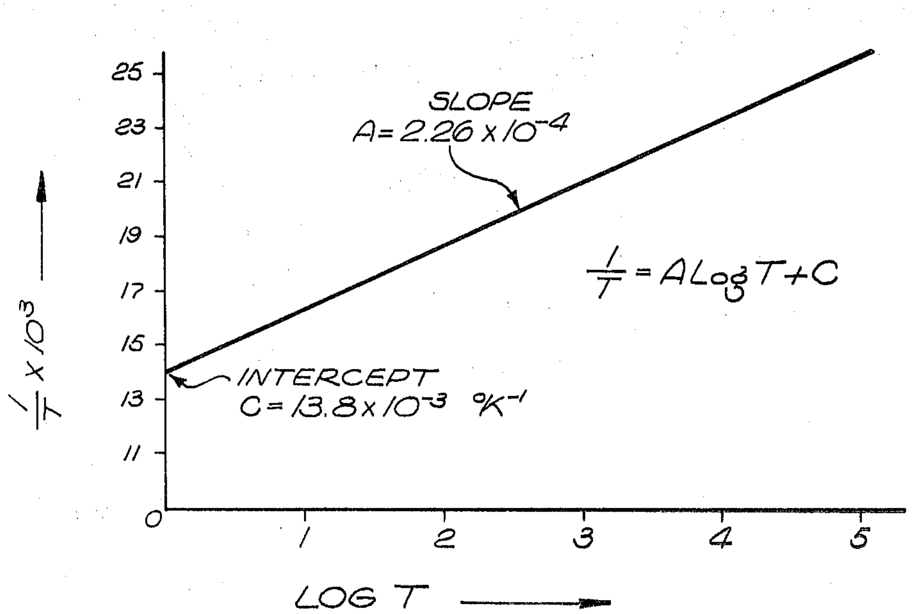
FIG. 8 is a plot of the logarithmic relationship between time required for 50% crystallization of iron oxide deposited at 140°C and the inverse of temperature of crystallization.

Referring to FIG. 8, when data obtained experimentally for films formed at 140°C are plotted in accordance with the foregoing equation, the line shown is obtained. The value of the slope, *A* and intercept, *C*, are:

$$A = 2.26 \times 10^{-4}$$

$$C = 13.8 \times 10^{-4}$$

Using this data, it can be calculated that a temperature of 1,452°C is required to crystallize the film in 300 microseconds. In order to achieve the 10 milliseconds requirement referred to above, a temperature of 820°C is required. Generally, as referred to above, to obtain such a temperature change in the time referred to, a thermal energy source which imparts 100 Joules/cm² to the amorphous iron oxide layer can be used.

The following examples will serve to further illustrate the invention.

EXAMPLE 1

Using vapor deposition techniques as illustrated in FIG. 1, at 130°C, amorphous iron oxide is deposited as a layer 250 A thick on a substrate of silicon. A xenon lamp is flashed for 5 milliseconds through a chromium mask in contact with the layer, imparting 200 Joules/cm² of heat to the exposed portions of the oxide layer to crystallize the exposed portions. The amorphous iron oxide layer is removed by exposure of the layered substrate to hydrogen chloride acid fumes to form a pattern mask on the silicon substrate.

EXAMPLE 2

Using vapor deposition techniques as illustrated in FIG. 1, at 152°C, a layer of amorphous iron oxide is deposited, 3,000 A thick on a substrate of silicon. An electron beam, such as described in FIG. 3, is utilized to impart 150 Joules/cm² to the surface of the amorphous iron oxide layer by controlling a 2 micron beam moving over the surface of the oxide layer at a linear rate of 7 microns/sec. A pattern of crystalline iron oxide is thereby formed which, upon removal of the remaining amorphous metal oxide by acid wash results in the formation of a pattern mask on the silicon substrate.

EXAMPLE 3

Using vapor deposition techniques as illustrated in FIG. 1, at 158°C, a layer of amorphous iron oxide is deposited, 1,000 A thick on a substrate of silicon. A pulse of lased light, as illustrated in FIG. 4, is used to impart 100 Joules/cm² to the surface of the amorphous iron oxide layer by controlling a 2 micron beam moving over the surface of the oxide at a linear rate of 7 microns/sec. A pattern of crystalline iron oxide is thereby formed. The remaining amorphous iron oxide is removed by washing in concentrated hydrochloric acid to yield a pattern mask on the silicon substrate.

In similar manner, other semiconductor materials or glass, metals, plastic or the like, can be utilized as substrates and other metal oxides can be used, deposited at temperatures described hereinbefore for the particular metal oxide, by chemical vapor deposition techniques, sputtering or the like.

Various modifications, changes, alterations and additions can be made in the present methods, their steps and parameters. All such modifications, changes, alterations and additions as are within the scope of the appended claims form part of the present invention.

I claim:

1. A process for forming a selected pattern of an iron oxide on the surface of a substrate, comprising:

depositing on said substrate a uniform layer of an amorphous iron oxide to a thickness of up to 3,000 A at a temperature below, but within 7% of, the crystallization temperature in °K of said amorphous iron oxide;

heating selected regions of said layer by exposure to a source of thermal energy imparting to said regions at least 100 Joules/cm² in less than 10 milliseconds to selectively convert said amorphous iron oxide to a crystalline form; and then removing remaining amorphous iron oxide to form a pattern of said crystalline iron oxide on said substrate surface.

2. The process according to claim 1 in which said deposition temperature is below but within 2% of the crystallization temperature in °K of said amorphous iron oxide.

3. The process according to claim 1 in which said substrate comprises semiconductor material.

4. The process according to claim 3 including the step, after removing said remaining amorphous iron oxide, of treating the portions of said semiconductor material exposed through said pattern to modify the electrical properties of said exposed portions.

5. The process according to claim 1 in which said source of thermal energy is a suitably energized source selected from the class consisting essentially of electron beam, laser beam and xenon flash.

6. The process according to claim 1 in which said iron oxide is undoped ferric oxide.

7. The process according to claim 1 in which said deposition temperature is less than 160°C and at least 130°C.

8. The process according to claim 7 in which said layer of amorphous oxide is deposited to a thickness of about 250 A – 3,000 A.

9. The process according to claim 7 in which said deposition temperature is at least 152°C.

10. The process according to claim 9 in which said thickness is about 500 A – 1,500 A.

11. The process according to claim 1 in which said depositing step comprises applying iron pentacarbonyl in combination with an oxidant therefor to a surface of said substrate while heating said substrate at said temperature to thermally decompose said iron pentacarbonyl to said amorphous iron oxide.

12. The process according to claim 1 in which said depositing step comprises sputtering a metal precursor of said iron oxide onto said substrate.

13. A process for forming a pattern mask of an iron oxide on the surface of a semiconductor body, comprising:

depositing on said body a uniform layer of about 250 A – 3,000 A thick of an amorphous iron oxide at a temperature less than 160°C and at least 130°C;

subjecting selected regions of said layer to a source of thermal energy imparting to said selected regions at least 100 Joules/$cm^2$ for a time sufficient to convert said amorphous metal oxide in said selected regions to a crystalline form; and then removing remaining amorphous iron oxide to form a pattern mask of said crystalline iron oxide on said substrate surface.

14. The process according to claim 13 in which said layer thickness is about 500–1,500 A and said deposition temperature is at least 152°C.

* * * * *